(12) United States Patent
Kaushik et al.

(10) Patent No.: US 11,550,679 B2
(45) Date of Patent: Jan. 10, 2023

(54) METHODS AND SYSTEMS FOR A NON-DISRUPTIVE PLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM

(71) Applicant: NetApp, Inc., Sunnyvale, CA (US)

(72) Inventors: Akhil Kaushik, Karnataka (IN); Anoop Vijayan, Karnataka (IN); Omprakash Khandelwal, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/219,812

(22) Filed: Mar. 31, 2021

(65) Prior Publication Data
US 2022/0318107 A1    Oct. 6, 2022

(51) Int. Cl.
*G06F 11/00* (2006.01)
*G06F 11/20* (2006.01)
*G06F 3/06* (2006.01)

(52) U.S. Cl.
CPC .......... *G06F 11/2094* (2013.01); *G06F 3/065* (2013.01); *G06F 3/067* (2013.01); *G06F 3/0619* (2013.01); *G06F 3/0644* (2013.01); *G06F 2201/82* (2013.01)

(58) Field of Classification Search
CPC .. G06F 11/2094; G06F 3/0619; G06F 3/0644; G06F 3/065; G06F 3/067; G06F 2201/82
USPC ...................................................... 714/1–57
See application file for complete search history.

(56) References Cited

U.S. PATENT DOCUMENTS

| | | |
|---|---|---|
| 5,742,792 A | 4/1998 | Yanai et al. |
| 6,389,551 B1 | 5/2002 | Yount |
| 6,415,372 B1 * | 7/2002 | Zakai .................... G06F 3/0629 |
| | | 711/170 |
| 7,039,827 B2 | 5/2006 | Meyer et al. |

(Continued)

OTHER PUBLICATIONS

Pan L., "Paxos at its heart is very simple," Distributed System, 2018, Retrieved From : https://blog.the-pans.com/paxos-explained/, pp. 1-12.

(Continued)

*Primary Examiner* — Sarai E Butler
(74) *Attorney, Agent, or Firm* — Jaffery Watson Mendonsa & Hamilton LLP

(57) ABSTRACT

Systems and methods are described for a non-disruptive planned failover from a primary copy of data at a primary storage system to a mirror copy of the data at a cross-site secondary storage system. According to an example, a planned failover feature of a multi-site distributed storage system provides an order of operations such that a primary copy of a first data center continues to serve I/O operations until a mirror copy of a second data center is ready. This planned failover feature improves functionality and efficiency of the distributed storage system by providing non-disruptiveness during planned failover—even if various failures occur. The planned failover feature also includes a persistent fence to avoid serving I/O operations during a timing window when both primary data storage and secondary data storage are attempting to have a master role to serve I/O operations and this avoids a split-brain situation.

19 Claims, 9 Drawing Sheets

(56) References Cited

U.S. PATENT DOCUMENTS

| | | | |
|---|---|---|---|
| 7,500,014 B1 | 3/2009 | Jacobson et al. | |
| 7,631,066 B1 | 12/2009 | Schatz et al. | |
| 7,640,451 B2 | 12/2009 | Meyer et al. | |
| 7,890,626 B1 | 2/2011 | Gadir | |
| 8,498,967 B1 | 7/2013 | Chatterjee et al. | |
| 8,645,623 B1* | 2/2014 | O'Shea | G06F 12/0866 |
| | | | 711/111 |
| 8,856,583 B1* | 10/2014 | Visser | G06F 11/2094 |
| | | | 714/4.11 |
| 8,874,960 B1* | 10/2014 | Khan | G06F 11/2028 |
| | | | 714/4.11 |
| 9,189,341 B1 | 11/2015 | Natanzon et al. | |
| 10,412,066 B1* | 9/2019 | Vemuri | G06F 21/79 |
| 10,496,320 B2 | 12/2019 | Eisler et al. | |
| 10,725,691 B1 | 7/2020 | Kaushik et al. | |
| 10,761,768 B1 | 9/2020 | Kaushik et al. | |
| 11,036,423 B2 | 6/2021 | Kaushik et al. | |
| 11,089,105 B1 | 8/2021 | Karumbunathan et al. | |
| 11,360,867 B1 | 6/2022 | Subramanian et al. | |
| 11,409,622 B1 | 8/2022 | Kaushik et al. | |
| 2002/0132613 A1 | 9/2002 | Leung et al. | |
| 2004/0153719 A1 | 8/2004 | Achiwa et al. | |
| 2005/0229034 A1 | 10/2005 | Fujibayashi | |
| 2006/0236048 A1 | 10/2006 | Deguchi et al. | |
| 2007/0180307 A1 | 8/2007 | Zohar et al. | |
| 2007/0234006 A1* | 10/2007 | Radulescu | G06F 15/7825 |
| | | | 712/28 |
| 2008/0201702 A1* | 8/2008 | Bunn | G06F 8/656 |
| | | | 717/171 |
| 2009/0043979 A1 | 2/2009 | Jarvis | |
| 2009/0089609 A1* | 4/2009 | Baba | H04L 69/40 |
| | | | 714/E11.113 |
| 2009/0307530 A1* | 12/2009 | Tarta | G06F 11/3668 |
| | | | 714/38.14 |
| 2010/0064168 A1 | 3/2010 | Smoot et al. | |
| 2010/0082962 A1* | 4/2010 | Srinivasan | G06F 9/4401 |
| | | | 711/E12.083 |
| 2010/0161554 A1* | 6/2010 | Datuashvili | G06F 16/184 |
| | | | 707/610 |
| 2011/0106855 A1 | 5/2011 | Resch et al. | |
| 2011/0314148 A1 | 12/2011 | Petersen et al. | |
| 2012/0151249 A1* | 6/2012 | Swan | G06F 11/1443 |
| | | | 714/4.11 |
| 2014/0298136 A1 | 10/2014 | Resch et al. | |
| 2015/0006949 A1 | 1/2015 | Bittles et al. | |
| 2015/0058838 A1 | 2/2015 | Tsirkin | |
| 2016/0366226 A1* | 12/2016 | Friedman | G06F 3/0608 |
| 2017/0093983 A1 | 3/2017 | Everhart et al. | |
| 2018/0260125 A1 | 9/2018 | Botes et al. | |
| 2018/0352032 A1 | 12/2018 | Liu et al. | |
| 2019/0004908 A1* | 1/2019 | Gopinath | G06F 11/1451 |
| 2019/0034286 A1 | 1/2019 | Brown et al. | |
| 2019/0229978 A1* | 7/2019 | Rajvaidya | H04L 41/0654 |
| 2019/0347352 A1 | 11/2019 | Gochkov et al. | |
| 2019/0394266 A1 | 12/2019 | Fukuyama et al. | |
| 2020/0034258 A1 | 1/2020 | Avraham et al. | |
| 2020/0050495 A1 | 2/2020 | Voutilainen et al. | |
| 2020/0050587 A1 | 2/2020 | Kaushik et al. | |
| 2020/0125460 A1* | 4/2020 | Selvaraj | G06F 3/0614 |
| 2020/0133520 A1 | 4/2020 | Patnaik et al. | |
| 2020/0273984 A1 | 8/2020 | Nakano et al. | |
| 2020/0278984 A1 | 9/2020 | Kaushik et al. | |
| 2020/0319982 A1* | 10/2020 | Rusev | G06F 11/2097 |
| 2020/0356274 A1 | 11/2020 | Kaushik et al. | |
| 2021/0303165 A1 | 9/2021 | Kaushik et al. | |
| 2021/0374157 A1* | 12/2021 | Reddy | G06F 16/273 |
| 2022/0019350 A1 | 1/2022 | Karr | |
| 2022/0121533 A1 | 4/2022 | Kumar et al. | |

OTHER PUBLICATIONS

U.S. Non-Final Office action dated Dec. 21, 2021 in U.S. Appl. No. 17/238,829.

U.S. Notice of Allowance dated Apr. 6, 2022 in U.S. Appl. No. 17/238,829.

U.S. Notice of Allowance dated Jun. 23, 2022 in U.S. Appl. No. 17/219,746.

U.S. Notice of Allowance dated Jun. 24, 2022 in U.S. Appl. No. 17/219,816.

* cited by examiner

US 11,550,679 B2

METHODS AND SYSTEMS FOR A NON-DISRUPTIVE PLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2021, NetApp, Inc.

FIELD

Various embodiments of the present disclosure generally relate to multi-site distributed data storage systems. In particular, some embodiments relate to improving system operation and user experience based on providing a non-disruptive planned failover from a primary storage system to a secondary mirrored storage system.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for a non-disruptive planned failover from a primary copy of data at a primary storage system to a mirror copy of the data at a cross-site secondary storage system. According to an example, a planned failover feature of a multi-site distributed storage system provides an order of operations such that a primary copy of a first data center continues to serve I/O operations until a mirror copy of a second data center is ready. This planned failover feature improves functionality and efficiency of the multi-site distributed storage system by providing non-disruptiveness during planned failover—in presence of various failures. The planned failover feature uses a combination of persistent fence and strong quorum consensus to avoid split-brain during a timing window where both primary and secondary data storage are attempting to have a master role to serve I/O operations.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
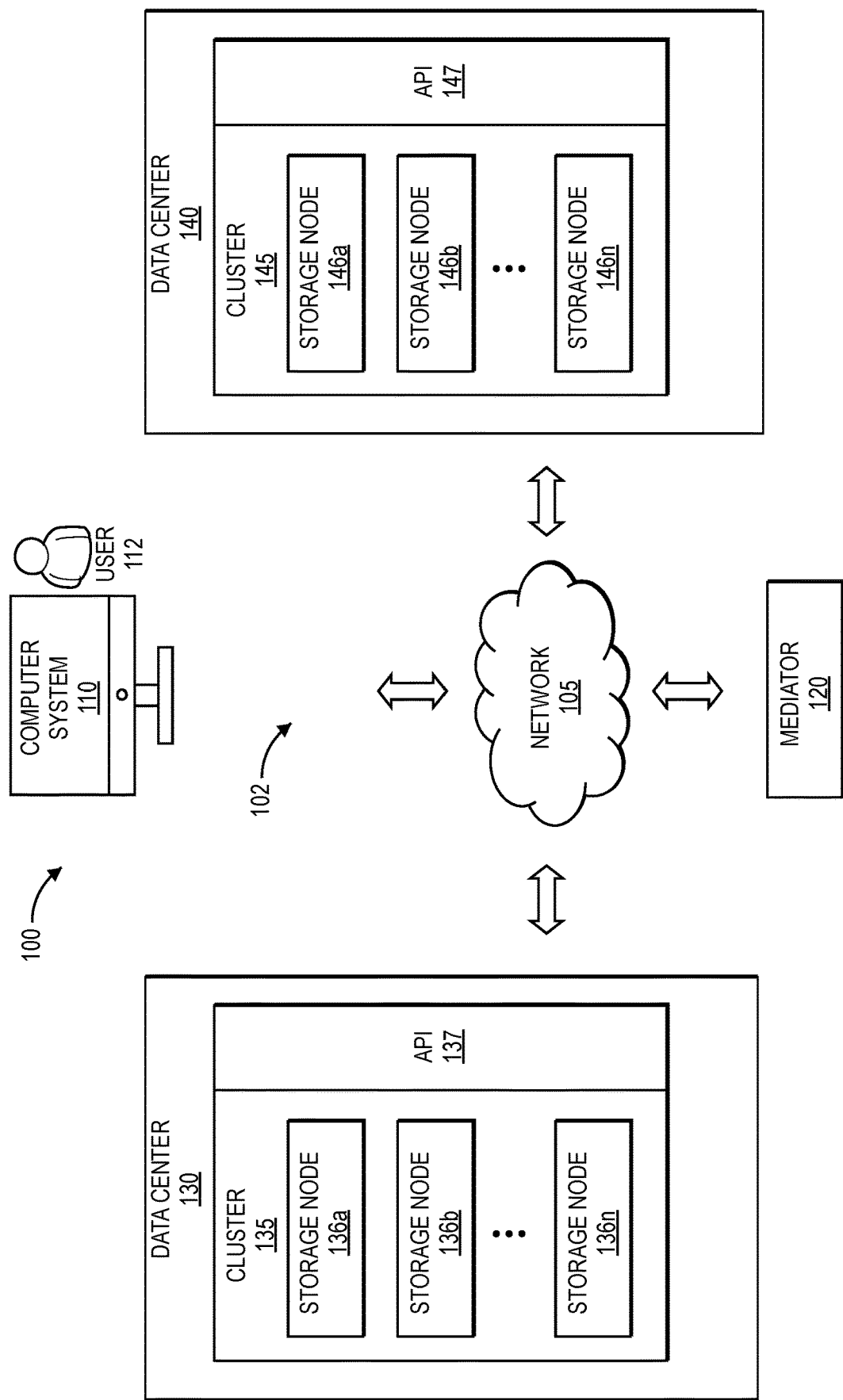
FIG. 1 is a block diagram illustrating an environment in which various embodiments may be implemented.

Multi-site distributed storage systems and computer-implemented methods are described for providing a planned failover feature to guarantee non-disruptive operations (e.g., operations of business enterprise applications, operations of software application) even in the presence of failures including, but not limited to, network disconnection between multiple data centers and failures of a data center or cluster. An order of operations performed by a planned failover includes a timing window where both a primary copy of a first data center and a mirror copy of a second data center are designated with a role of a master and therefore are capable of serving input/output (I/O) operations (e.g., I/O commands) to an application independently. However, if multiple data centers are simultaneous allowed to serve I/O operations, then this cause a split-brain situation and results in data consistency issues.

This planned failover feature of a multi-site distributed storage system provides an order of operations such that a primary copy of a first data center continues to serve I/O operations until a mirror copy of a second data center is ready. This planned failover feature improves functionality and efficiency of the multi-site distributed storage system by providing non-disruptiveness during planned failover—in presence of various failures. The planned failover feature also includes a persistent fence to avoid serving I/O operations during a timing window when both primary data storage and secondary data storage are attempting to have a master role to serve I/O operations and this avoids a split-brain situation. A strong consensus can be determined even during the presence of multiple failures. The multi-site distributed storage system upon obtaining a new consensus, will persistently cache this consensus in a second cluster of a second data center. In one example, after obtaining a positive consensus that is cached, a second cluster reboots and after the second cluster is operational, connectivity to the mediator is lost (either transient or persistent). This caching of the consensus provides non-disruptiveness in a double failure scenario where the second cluster performs a reboot and meanwhile the connectivity to the mediator fails in a transient or permanent manner Operations of business enterprises and software applications that utilize a multi-site distributed storage system are improved due to being able to continuously access that distributed storage system even in the presence of multiple failures within the distributed storage system or failures between components of the distributed storage system.

A current approach that has more disruption and down time due to one or more failures within a storage system or between storage systems will be less efficient in serving I/O operations due to the disruption of operations including serving I/O operations. The current approach will not be able to determine a consensus for serving I/O operations if a connection from a data center to a mediator is lost or disrupted. In this case, a primary storage and secondary mirror storage may both attempt to obtain consensus and both attempt to serve I/O operations simultaneously, which will reduce the distributed storage system efficiency and congest network connections to clients with redundant responses to I/O operations.

Other current approaches provide local high availability protection with non-disruptive operations in the event of a single controller failure. In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

A planned failover of storage access from a primary copy of the dataset to a cross-site mirror copy is desired due to business process requirements to prove that the mirror copy actually works in case of a real disaster and also as a general practice to periodically switch the primary and mirror data centers.

A planned failover is desired for a distributed high availability storage system. The planned failover can also be used for non-disruptive migration of workloads in a planned fashion. Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. For example, various embodiments may include one or more of the following technical effects, advantages, and/or improvements: (i) order of operations of a planned failover operation such that a primary copy of storage continues to serve I/O operations until a mirror copy is ready; (ii) guarantee non-disruptiveness during planned failover—in presence of various failures; (iii) persistently caching a consensus to avoid disruption even when connectivity to a mediator is disrupted; (iv) engaging filesystem persistent fence to reduce complexity of overall solution when dealing with controller reboots during planned failover; and (v) avoidance of split-brain by the way of a strong consensus in a Paxos instance that covers primary copy of a consistency group (CG), mirror copy of CG, and the mediator.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions.

Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
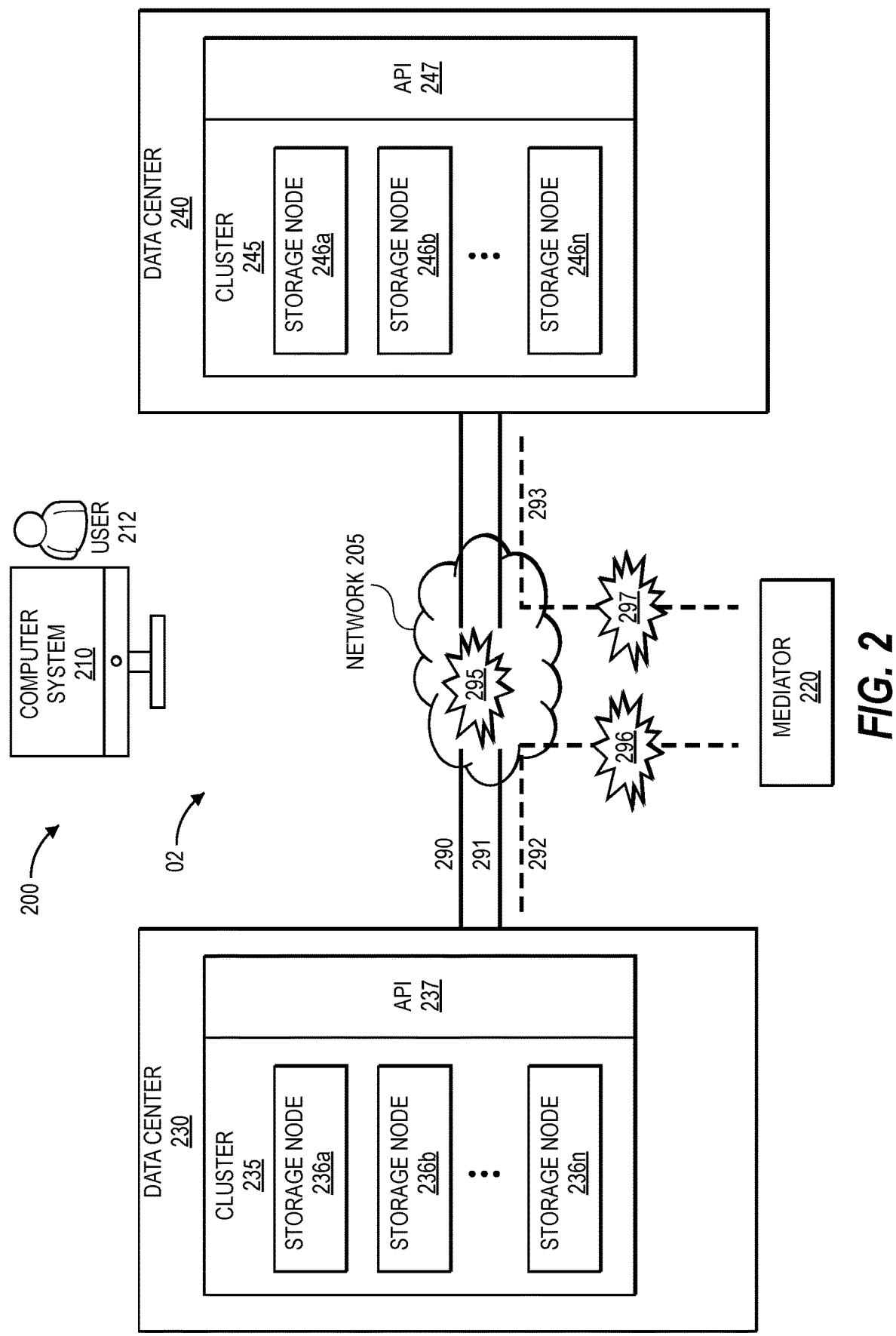
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 consistency groups with each consistency group having up to 12 volumes. The system 202 provides a planned failover feature at a consistency group granularity. The planned failover feature allows switching storage access from a primary copy of the data center 230 to a mirror copy of the data center 240 or vice versa.

Figure 3:
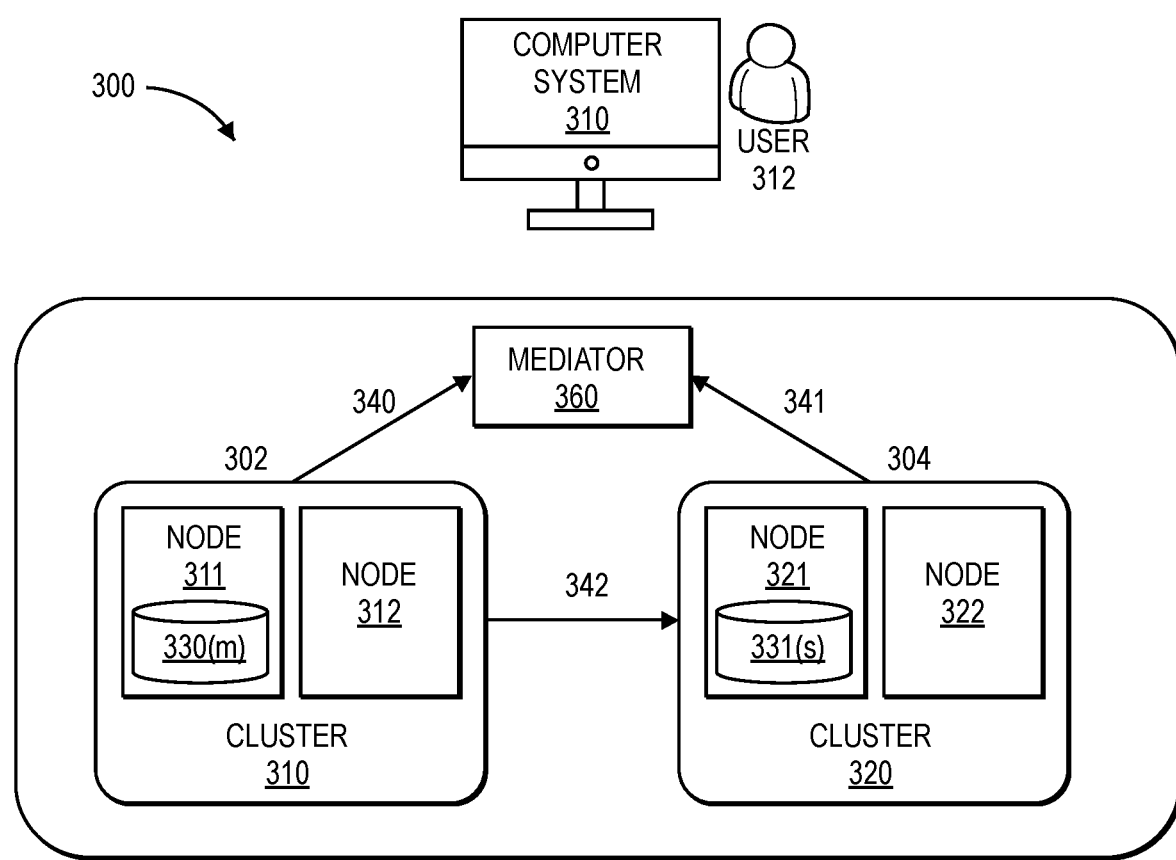
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O operations to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O operations to requesting clients, then this forms a strong consensus.

The master and slave roles for the clusters 310 and 320 help to avoid a split-brain situation with both of the clusters simultaneously attempting to serve I/O operations. There are scenarios where both master and slave copies can claim to be a master copy. For example, a recovery post failover or failure during planned failover workflow can results in both clusters 310 and 320 attempting to serve I/O operations. In one example, a slave cannot serve I/O until an AUFO happens. A master doesn't serve I/O operations until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
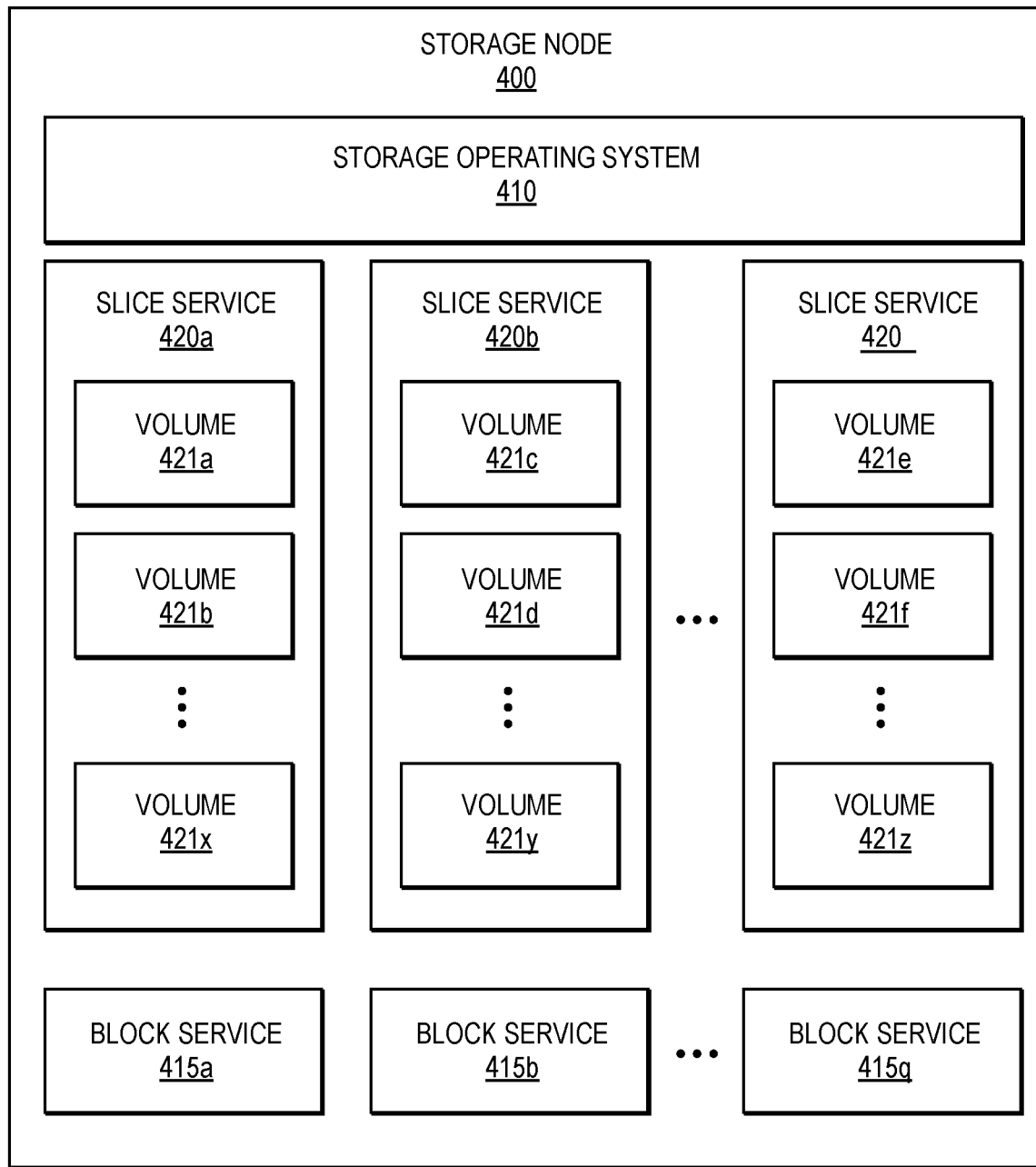
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 714, 752, 754) described herein. In the context of the present example, a storage node 400 may be a network storage controller or controller that provides access to data stored on one or more volumes. The storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
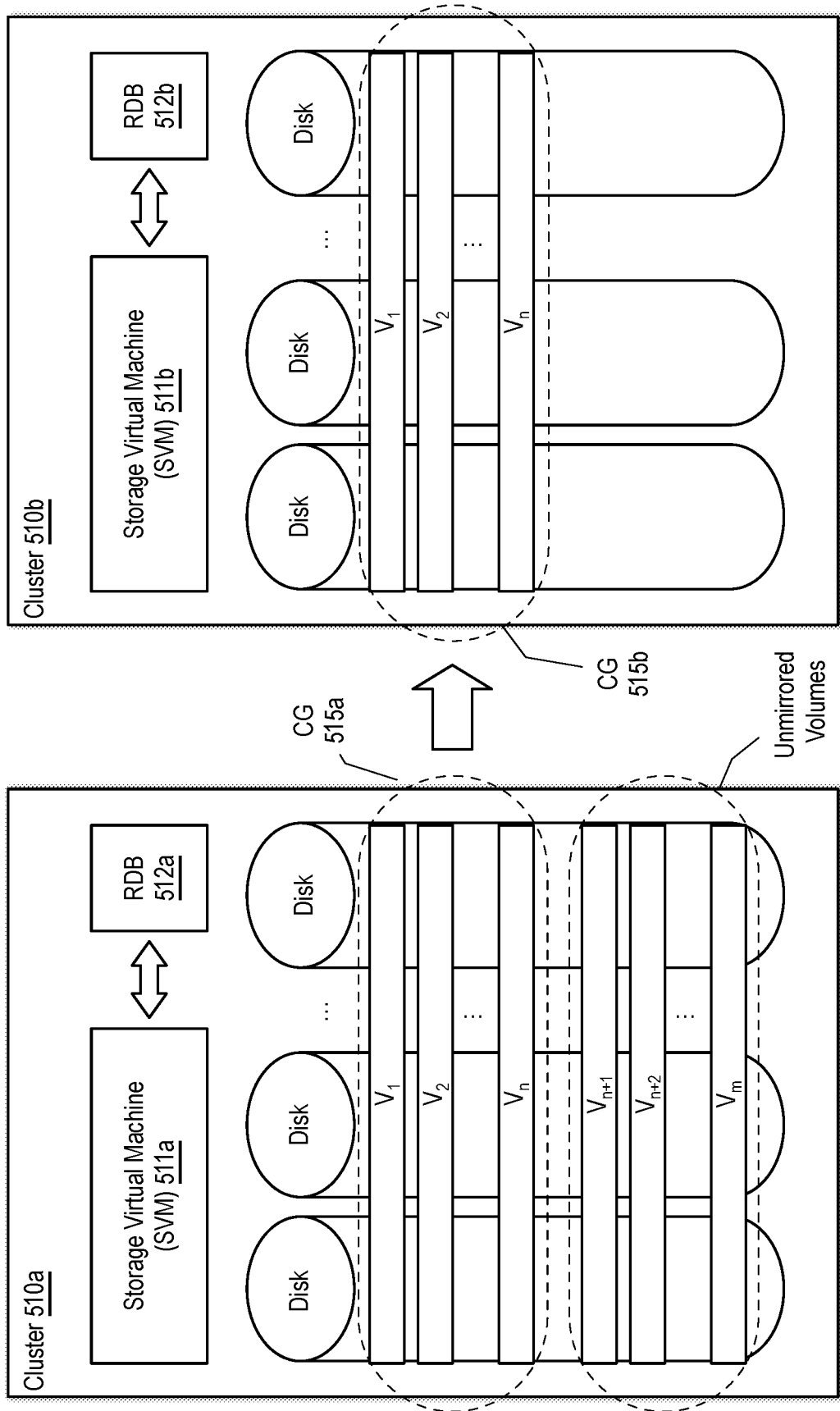
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

Figure 6:
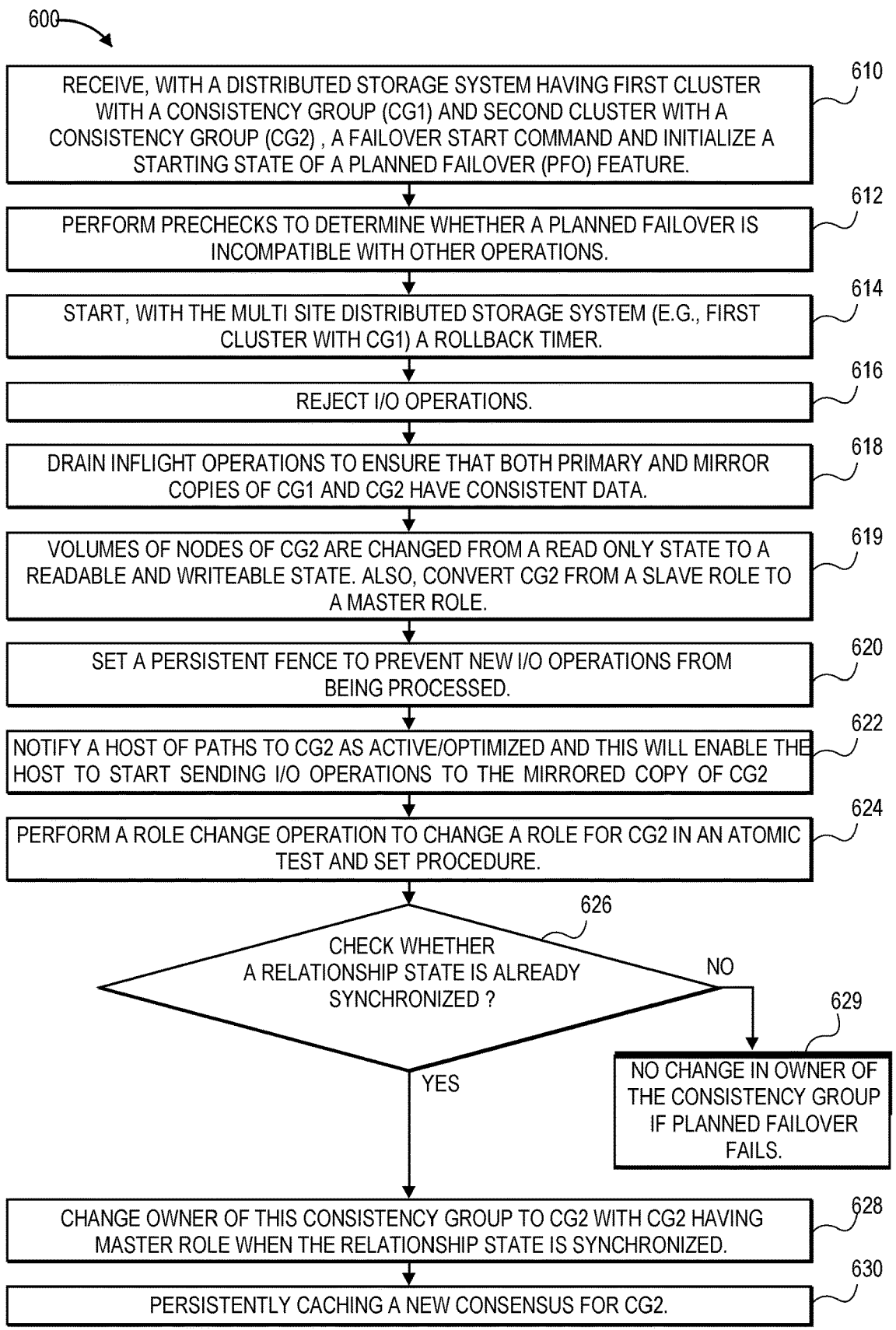
FIG. 6 is a flow diagram illustrating a computer-implemented method 500 of operations for a planned failover feature that provides non-disruptiveness in presence of failures in accordance with an embodiment of the present disclosure.

FIG. 6 is a flow diagram illustrating a computer-implemented method 600 of operations for a planned failover feature that provides non-disruptiveness in presence of failures in accordance with an embodiment of the present disclosure. As noted above, this planned failover feature of the present design provides an order of operations such that a primary copy of a first data center continues to serve I/O operations until a mirror copy of a second data center is ready. This planned failover feature provides non-disruptiveness during planned failover—in presence of various failures. The planned failover feature also avoids a split-brain situation by the way of a strong consensus (e.g., strong consensus in a PAXOS instance) based on having a primary copy of a first data center, a mirror copy with a second data center, and a mediator at a third site.

Although the operations in the computer-implemented method 600 are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 600 may be executed by a storage controller, a storage virtual machine (e.g., SVM 511*a*, SVM 511*b*), a mediator (e.g., mediator 120, mediator 220, mediator 360), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes a first cluster having a primary copy of data in a consistency group (CG1). The consistency group of the first cluster is assigned a master role. A second cluster has a mirror copy of the data of the primary copy in the consistency group. The consistency group of the second cluster (CG2) is assigned a slave role.

At operation 610, a multi-site distributed storage system having the first and second clusters receives a failover start command and this initializes a starting state of a planned failover (PFO) feature. At operation 612, prechecks are performed by the multi-site distributed storage system to determine whether a planned failover is incompatible with other operations. For example, a move operation for a volume would need to be allowed to complete before the planned failover proceeds. At operation 614, the multi-site distributed storage system (e.g., first cluster) starts a rollback timer. Expiration of this timer causes a fence (e.g., persistent fence at operation 620) to drop and allow I/O operations locally on the first cluster. This rollback timer provides non-disruptiveness from the consistency group of the first cluster before a role change operation (e.g., role change operation 624). Any failure that results in failing the planned failover operation, such as network connectivity issues or slowness leading to timeout issues, will prevent the role change operation. In that case, the rollback timer at the consistency group of the first cluster (CG1) will pre-empt the role change operation and allow I/O operations locally at CG1 thereby guaranteeing non-disruptiveness. This timer also enables making planned failover operation a time-bound operation by the way of setting the timer to a user defined value. If the steps leading to the role change operation take longer than the timeout, I/O commands will resume based on the timer expiry.

At operation 616, the computer-implemented method includes rejecting I/O operations at the first cluster. At operation 618, the computer-implemented method includes draining inflight operations at the first cluster to ensure that both primary and mirror copies of CG1 and CG2 have consistent data. At operation 619, volumes of nodes of CG2 are changed from a read only state to a readable and writeable state. Also, at operation 619, the computer-implemented method converts CG2 from a slave role to a master role.

At operation 620, the computer-implemented method includes setting a persistent fence to prevent new I/O operations from being processed by the multi-site distributed storage system or the second cluster. A filesystem persistent fence for data storage management software is used to implement this. Once activated, the fence is persistent and therefore handles any failures including a controller reboot for a controller of a cluster. Also, as a part of this operation, the CG1 initially having the master role releases a consensus that CG1 previously had—carry forward from steady state. Releasing the consensus from CG1 allows the CG2 to acquire a consensus as part of a subsequent role change operation 624 (e.g., cutover operation, point of no return operation).

At operation 622, the computer-implemented method includes notifying a host of paths to CG2 as active/optimized and this will enable the host to start sending I/O operations to the mirrored copy of CG2.

Figure 7:
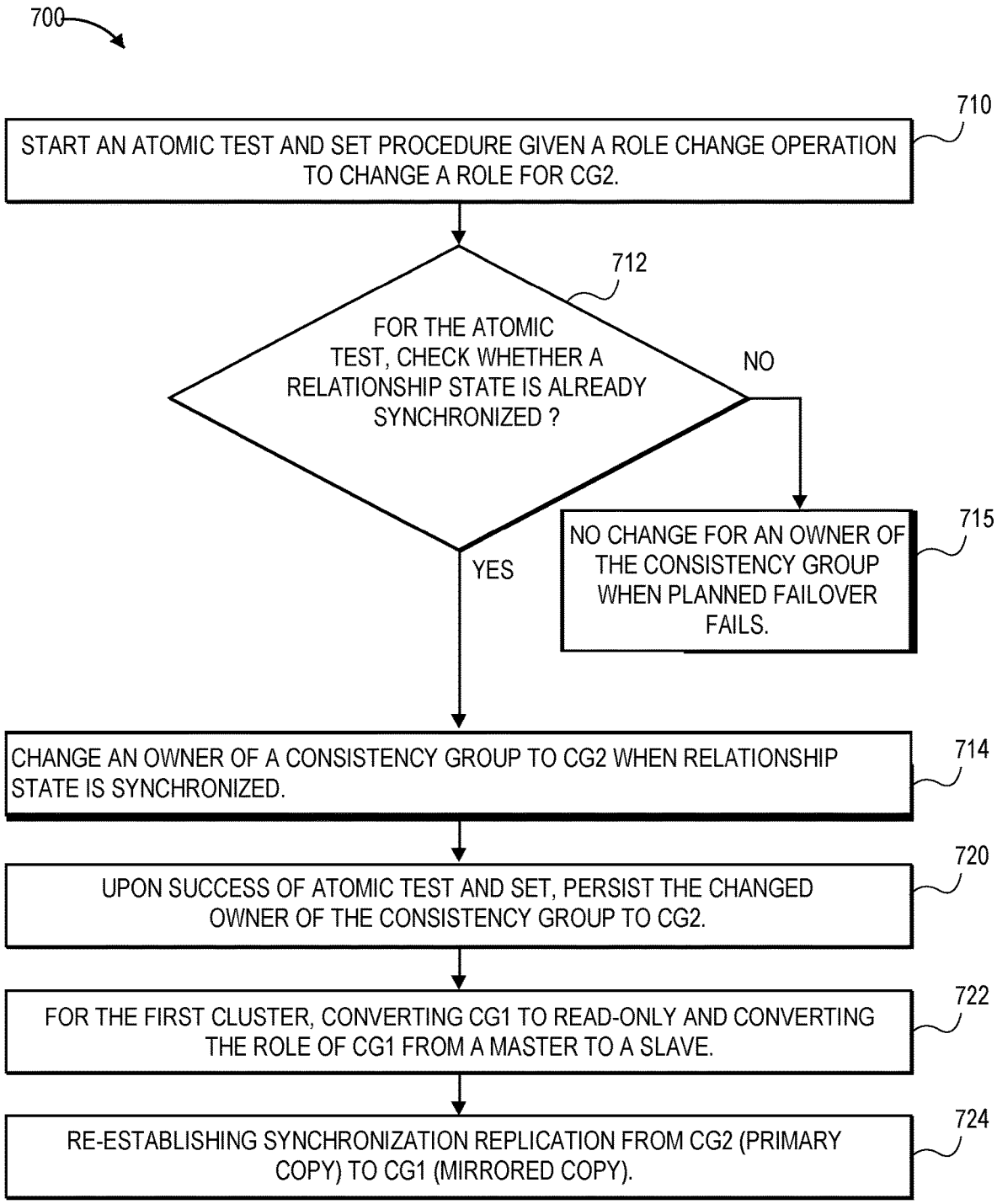
FIG. 7 is a flow diagram illustrating a computer-implemented method 600 of operations for an atomic test and set procedure of a planned failover feature in accordance with an embodiment of the present disclosure.

At operation 624, the computer-implemented method includes a role change operation to change a role for CG2 in an atomic test and set procedure, which is described and illustrated in FIG. 7. The atomic test involves checking whether a relationship state between primary and mirror copies is already synchronized (e.g., a mirror copy (slave) is failover capable) or not at operation 626. If a relationship state is synchronized (e.g., in sync state), then the mirror copy (slave) will be failover capable. At operation 628, the setting to change owner of this consistency group to CG2 (master) only occurs when atomic test determines that the relationship is synchronized. A change of ownership is stored as a database update with a mediator. If the atomic test fails with relationship state not in sync state and thus a planned failover fails, then no change occurs in owner of the consistency group at operation 629. In a normal case, the second cluster checks that the relationship is still synchronized and then in an atomic fashion changes the owner for this CG to CG2.

At operation 630, the computer-implemented method includes a new consensus being persistently cached by CG2. This caching provides non-disruptiveness in a double failure scenario where the second cluster performs a reboot and meanwhile the connectivity to the mediator fails in a transient or permanent manner Upon reboot, CG2 uses the persistent cached consensus to allow I/O operations. This cache also allows for non-disruptiveness, for a case where before role change operation 624, CG1 loses connectivity to the mediator and the rollback timer expires. The multi-site distributed storage system allows a master to acquire consensus directly from CG2 over an inter cluster link. Before the role change operation 624, a consensus request over inter cluster will fail planned failover and mark CG2 failover-incapable (implicit consensus to CG1). After role change operation 624, a consensus request over the inter cluster communication link is rejected via the persistently cached outcome of the operation 524.

A race between the CG1 and CG2 is handled via a tiebreaker mediator agent that serializes local as well as requests from across the other cluster and provides a first come first serve guarantee.

The planned failover feature avoids a split-brain situation by way of a strong consensus in a three party quorum including CG1, CG2, and the Mediator. Planned failover defines a role change operation, which can be thought of as a cutover for Host I/O from a primary copy to a mirror copy. The role change operation is implemented as a strong consensus in a three party quorum. CG1 and CG2 can request for a consensus and Mediator implements an atomic test and set procedure to grant a consensus.

In one example, CG1, CG2 and Mediator in a quorum can be thought of as part of Paxos group and strong consensus as a Paxos consensus. Paxos is a family of protocols for solving consensus in a network of unreliable or fallible processors. Consensus is the process of agreeing on one result among a group of participants. This problem becomes difficult when the participants or their communications may experience failures. A strong consensus avoids split-brain for the following examples:

A first example is a basic race between first cluster timer expiring and obtaining consensus to resume I/O operations locally and the planned failover workflow obtaining consensus as part of operation 624.

A second example includes both first and second clusters performing a reboot after operation 618 (e.g., 2 master situations) but before operation 624. In this case, both CG1 and CG2 will attempt to obtain consensus and the first one will be granted the consensus.

A third example involves both clusters performing a reboot after operation 624 but before CG1 is set to read only state (e.g., another 2 master situation where both clusters will go for consensus but since operation 624 has already taken place, CG1 will not get the consensus even if it is the first one to request for it).

FIG. 7 is a flow diagram illustrating a computer-implemented method 700 of operations for an atomic test and set procedure of a planned failover feature in accordance with an embodiment of the present disclosure. As noted above, this atomic test and set procedure feature avoids a race condition for control of serving I/O operations between CG1 and CG2.

Although the operations in the computer-implemented method 700 are shown in a particular order, the order of the actions can be modified. Thus, the illustrated embodiments can be performed in a different order, and some operations may be performed in parallel. The numbering of the operations presented is for the sake of clarity and is not intended to prescribe an order of operations in which the various operations must occur. Additionally, operations from the various flows may be utilized in a variety of combinations.

The operations of computer-implemented method 700 may be executed by a storage controller, a storage virtual machine (e.g., SVM 511a, SVM 511b), a mediator (e.g., mediator 120, mediator 220, mediator 360), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes a first cluster having a primary copy of data in a consistency group (CG1). The consistency group of the first cluster is assigned a master role. A second cluster has a mirror copy of data of the primary copy in the consistency group. The consistency group of the second cluster (CG2) is assigned a slave role.

At operation 710, a computer-implemented method includes starting an atomic test and set procedure given a role change operation (e.g., operation 624 of FIG. 6) to change a role for CG2. At operation 712, the atomic test involves checking whether a relationship state between the primary and mirrored copies is already synchronized in a sync state (e.g., a mirror copy is failover capable). If a relationship state is synchronized (e.g., in sync state), then the mirror copy (slave) will be failover capable. If the relationship is synchronized, then a setting to change an owner of a consistency group to CG2 occurs at operation 714. A change of ownership is stored as a database update with a mediator. If the atomic test fails with relationship state not in sync state and thus a planned failover fails, then no change for an owner of the consistency group occurs at operation 715.

Atomic test-and-set is utilized to avoid any race between rollback timer expiry and related processing from CG1 and operation 624 from CG2. In a normal case, the second cluster checks that the relationship is still synchronized and then in an atomic fashion changes the owner for this CG to CG2. This is sufficient to fail any subsequent attempt from CG1 to acquire consensus.

Upon success of atomic test and set, the computer-implemented method includes persisting the changed owner of a consistency group to CG2 at operation 720. This persistence of the changed owner guarantees non-disruptive operations in the event of a failure resulting in a controller reboot or a takeover from a partner node. At operation 722, the computer-implemented method includes for the first cluster converting CG1 to read-only and converting the role of CG1 from a master to a slave. At operation 724, the computer-implemented method includes re-establishing synchronization replication from CG2 (primary copy) to CG1 (mirrored copy).

Figure 8:
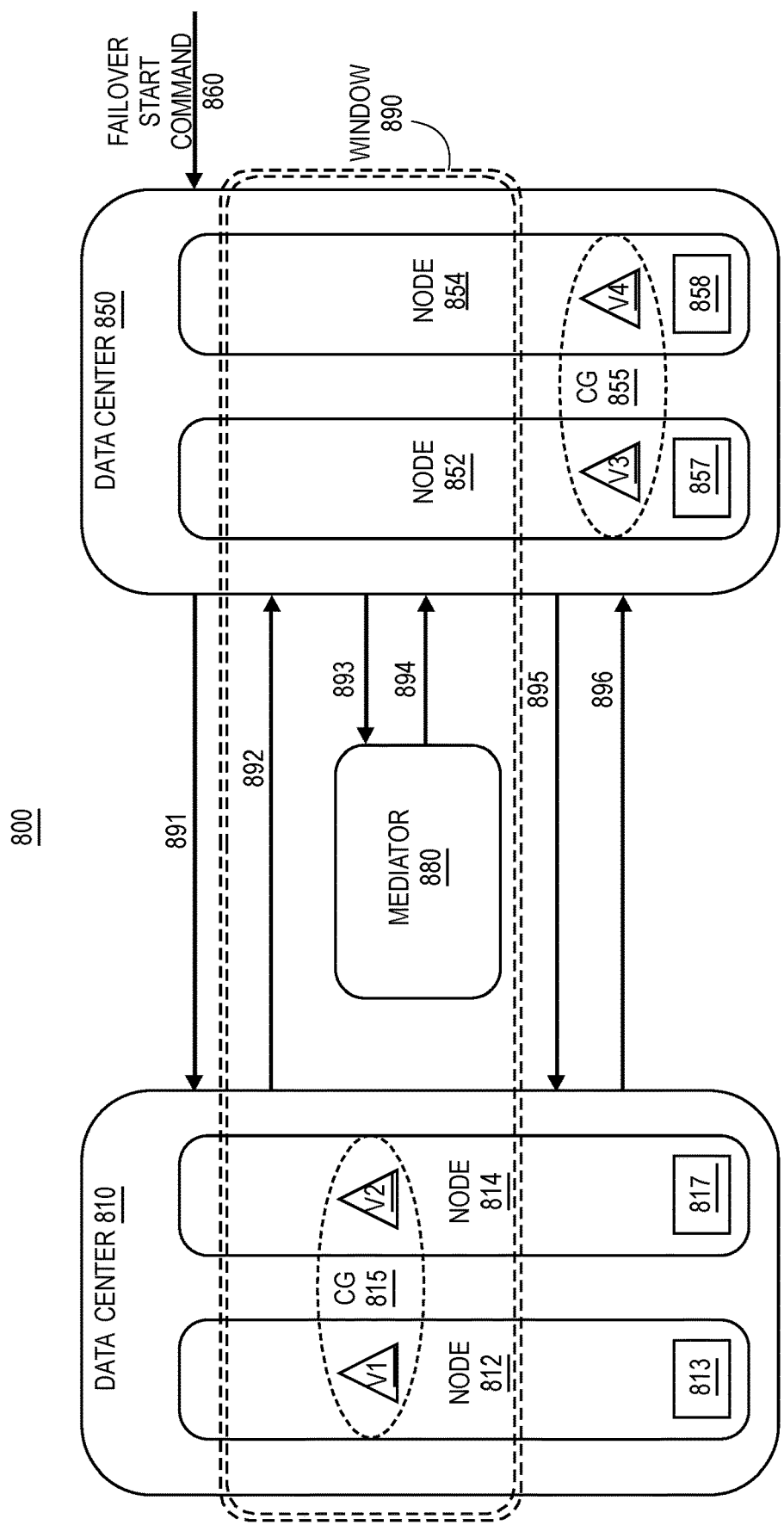
FIG. 8 is a block diagram of a multi-site distributed storage system 700 that performs a planned failover feature in accordance with an embodiment of the present disclosure.

FIG. 8 is a block diagram of a multi-site distributed storage system 800 that performs a planned failover feature in accordance with an embodiment of the present disclosure. As noted above, this planned failover feature of the present design provides an order of operations such that a primary copy of data at a data center 810 continues to serve I/O operations until a mirror copy of the data at a data center 850 is ready. This planned failover feature provides non-disruptiveness during planned failover from a primary copy of data to a second copy of the data—in presence of various failures. The planned failover feature also avoids a split-brain situation by the way of a strong consensus (e.g., strong consensus in a Paxos instance) based on having a primary copy of a first data center, a mirror copy with a second data center, and a mediator 880 at a third site.

In one embodiment, the distributed storage system 800 includes the data center 710 having a first cluster with a primary copy of data in a consistency group (CG) 815. A consistency group may include a subset or all volumes of a storage node. The consistency group 815 includes volume V1 of node 812 and volume V2 of node 814. Initially, CG 815 can be assigned a master role. The data center 850 includes a second cluster having a mirror copy of the data in the consistency group 855. The consistency group 855 may include a volume V3 of node 852 and volume V4 of node 854. CG 855 can be initially assigned a slave role prior to a planned failover.

The distributed storage system 800 having the first and second clusters receives a planned failover start command 860 and this initializes a starting state of a planned failover (PFO) feature. The planned failover may be implemented to provide non-disruptive operations even in the presence of failures including but not limited to network disconnection between data centers and a mediator, and even if an entire data center becomes non-functional. Next, prechecks are performed by the data center 850 to determine whether a planned failover is incompatible with other operations. If so, incompatible operations are completed prior to proceeding with the planned failover. Then, a communication 891 is sent to the data center 810. In response, the data center 810 starts a rollback timer. Expiration of this timer causes a fence to drop and allow I/O operations locally at data center 810. This rollback timer provides non-disruptiveness from the consistency group 815 before a role change operation (e.g., role change operation 624) occurs.

Any failure that results in failing the planned failover operation, such as a network connectivity issues or slowness leading to timeout issues, will prevent the role change operation. In that case, the rollback timer at the consistency group 815 will pre-empt the role change operation and allow I/O operations locally at CG 815 thereby guaranteeing non-disruptiveness. This timer also enables making planned failover operation a time-bound operation by the way of setting the timer to a user defined value. If the operations leading to the role change operation take longer than the timeout, I/O commands will resume based on the timer expiry.

Next, the data center 810 rejects I/O operations and drains inflight operations to ensure that both primary and mirror copies of CG 815 and CG 855 have consistent matching content of data. A communication 892 is then sent from data center 810 to data center 850 and this causes volumes V3 and V4 of CG 855 to change from an initial read only state to a readable and writeable state. Also, the data center 850 converts CG 855 from a slave role to a master role and sets a persistent fence to prevent new I/O operations from being processed by the data center 850 until a role change operation (e.g., operation 624, point of no return operation) occurs. A filesystem persistent fence is used to implement this persistent fence. Once activated, the fence is persistent and therefore handles any failures including a controller reboot for a controller of a cluster or data center. Also, as a part of this operation, the CG 815 initially having the master role releases a consensus that the CG 815 previously had—carry forward from steady state. Releasing the consensus from CG 815 allows the CG 855 to acquire a consensus from mediator 880 as part of a subsequent role change operation (e.g., operation 624, point of no return operation) based on communications 893 and 894.

The multi-site distributed storage system can notify a host of paths to CG 855 as being active and optimized and this will enable the host to start sending I/O operations to the mirrored copy of CG 855. CG 855 can notify a proxy module of a change from I/O operations for CG 855 being forwarded to CG 815 and instead the I/O operations are processed locally at CG 855. Each node (e.g., 812, 814, 852, 854) includes a proxy module (e.g., 813, 817, 857, 858) for these notifications.

Next, a role change operation occurs to change a role for CG 855 in an atomic test and set procedure, which is described and illustrated in FIG. 7. The atomic test involves checking whether a relationship is already synchronized (e.g., primary and mirror copies are both failover capable) and the setting to change owner of this consistency group to CG 855 only occurs when atomic test determines that the relationship is synchronized. In a normal case, CG 855 checks that the relationship is still synchronized and then in an atomic fashion changes the owner for this CG from CG 815 to CG 855. Then, a bypass fence operation is performed to allow CG 855 to locally serve I/O operations. A timing window 890 includes the reject I/O operations, drain inflight operations, set volumes in CG 855 to read write, set persistent fence for CG 855, set CG 855 from slave to master role, send notifications for proxy modules, perform role change for CG 755, and set the bypass fence for CG 855. The persistent fence is used to avoid serving I/O operations during the timing window 890 when both primary data storage (e.g., CG 815) and secondary data storage (e.g., CG 855) are attempting to have a master role to serve I/O operations and this avoids a split-brain situation.

A communication 895 is sent to CG 815 and this causes a master role to change to a slave role for CG 815. CG 815 can notify a proxy module of a change from I/O operations being locally processed at CG 815 and instead forwarding the I/O operations to CG 855 for processing. A communication 896 is sent to CG 855 and then volumes of CG 855 are resynchronized to volumes of CG 815.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
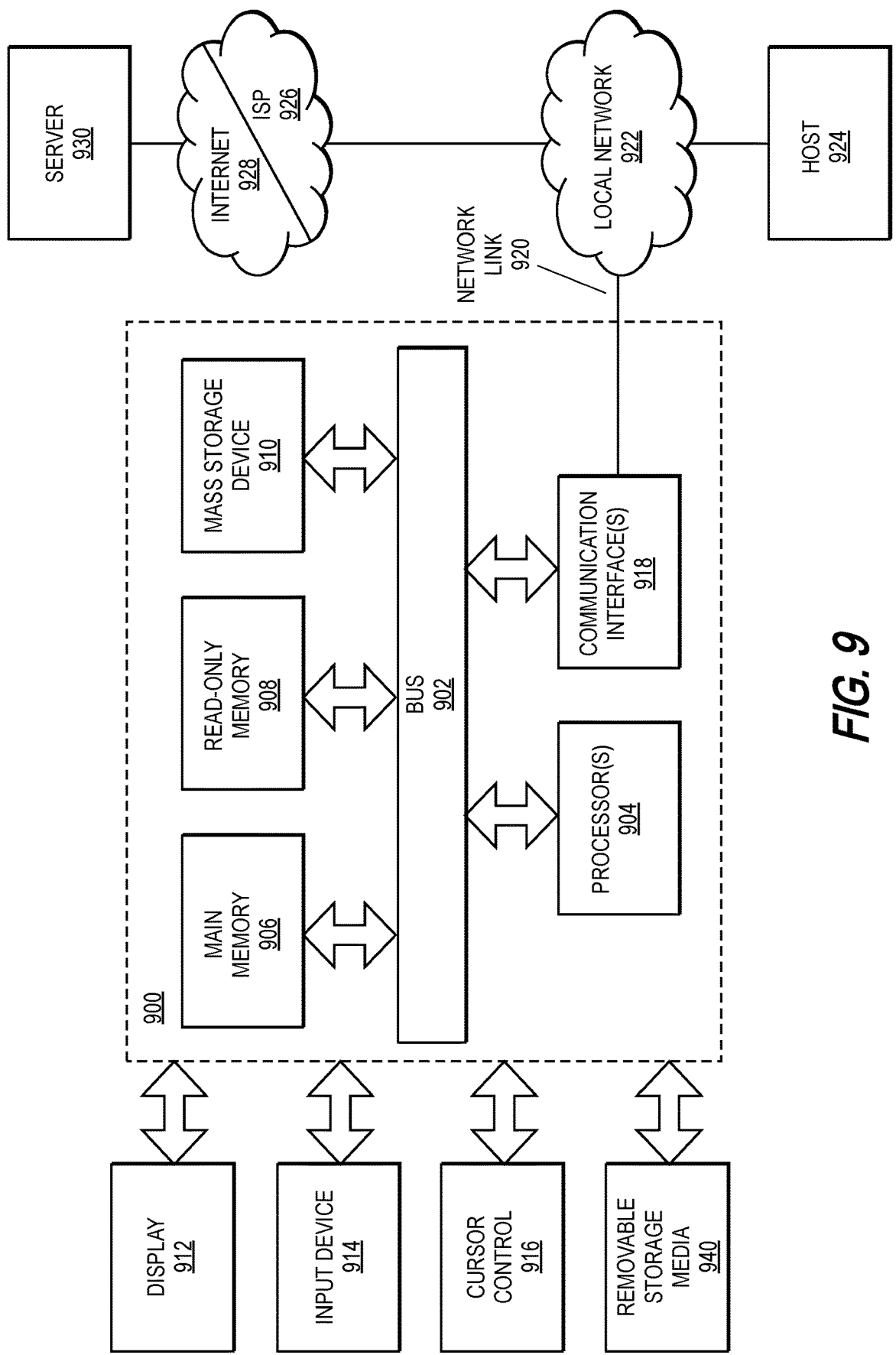
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources associated with a storage node (e.g., storage node 136a-n, storage node 146a-n, storage node 236a-n, storage node 246a-n, nodes 311-312, nodes 321-322, storage node 400, nodes 812, 814, 852, 854), a mediator (e.g., mediator 120, mediator 220, mediator 360), or an administrative work station (e.g., computer system 110, computer system 210). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., processing logic, hardware processor(s) 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc Read Only Memory (CD-ROM), Compact Disc—Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A computer-implemented method for a non-disruptive planned failover performed by one or more processors of a multi-site distributed storage system, the method comprising:
    initializing a starting state of a planned failover (PFO) of the multi-site distributed storage system to provide planned failover for serving input/output (I/O) operations from a first cluster having a primary copy of data to a second cluster having a mirrored copy of the data;
    starting, with the first cluster, a rollback timer for pre-empting a role change operation if the rollback timer expires prior to performing the role change operation to provide non-disruptiveness of control for serving input/output (I/O) operations with the first cluster;
    setting a persistent fence to prevent new input/output (I/O) operations from being processed by the multi-site distributed storage system; and
    performing the role change operation to change a role for the second cluster to process I/O operations when the role change operation occurs prior to expiration of the rollback timer.

2. The computer-implemented method of claim 1, wherein the first cluster has the primary copy of the data in a consistency group that is initially assigned a master role, wherein the second cluster has the mirrored copy of the data in the consistency group that is initially assigned a slave role, wherein the planned failover is performed even if multiple failures occur.

3. The computer-implemented method of claim 1, wherein the rollback timer provides non-disruptiveness for a consistency group before the role change operation is performed.

4. The computer-implemented method of claim 1, wherein expiration of the rollback timer prior to the role change operation causes pre-emption of the role change operation and allows I/O operations to continue being served locally by the first cluster, wherein expiration of the rollback timer after the role change operation causes the I/O operations to be processed by the second cluster.

5. The computer-implemented method of claim 1, wherein the rollback timer comprises a user defined value to cause the planned failover to be a time-bound operation by way of setting the rollback timer to a user defined value.

6. The computer-implemented method of claim 1, further comprising:
    changing volumes of storage nodes of a consistency group of the second cluster from a read only state to a readable and writeable state, wherein performing the role change operation comprises using an atomic test and set procedure to change a role for the second cluster with the atomic test and set procedure to check whether a relationship state between the primary copy of the data and the mirrored copy of the data is synchronized and converting the consistency group of the second cluster from a slave role to a master role when the relationship state between the primary copy of the data and the mirrored copy of the data is synchronized.

7. The computer-implemented method of claim 1, further comprising releasing a consensus for a consistency group of the first cluster when setting the persistent fence.

8. The computer-implemented method of claim 1, further comprising:
    obtaining, with a mediator, a new consensus for a consistency group of the second cluster; and
    persistently cache the new consensus, wherein the caching of the consensus provides non-disruptiveness in a double failure scenario when the second cluster performs a reboot and the connectivity to the mediator fails in a transient or permanent manner.

9. A multi-site distributed storage system comprising:
    a processing resource including a hardware processor; and
    a non-transitory computer-readable medium coupled to the processing resource, having stored therein instructions, which when executed by the processing resource cause the processing resource to:
        initialize a starting state of the planned failover (PFO) of the multi-site distributed storage system to provide planned failover from a first cluster having a primary copy of data in a consistency group to a second cluster having a mirrored copy of the data,
        start a rollback timer for pre-empting a role change operation if the rollback timer expires prior to performing the role change operation to provide non-disruptiveness of control for serving input/output (I/O) operations with the first cluster,
        set a persistent fence to prevent new input/output (I/O) operations from being processed by the multi-site distributed storage system, and
        perform a role change operation to change a role for the second cluster to process I/O operations when the role change operation occurs prior to expiration of the rollback timer.

10. The distributed storage system of claim 9, wherein the instructions when executed by the processing resource cause the processing resource to start the rollback timer to provide non-disruptiveness for the consistency group before the role change operation is performed even if multiple failures occur.

11. The distributed storage system of claim 9, wherein expiration of the rollback timer prior to the role change operation causes pre-emption of the role change operation and allows I/O operations to continue being served locally by the first cluster, wherein expiration of the rollback timer after the role change operation causes the I/O operations to be processed by the second cluster.

12. The distributed storage system of claim 9, wherein the persistent fence prevents I/O operations from being served during a timing window when both the first cluster and the second cluster are attempting to have a master role to serve I/O operations and this avoids a split-brain situation.

13. The distributed storage system of claim 9, wherein the instructions when executed by the processing resource cause the processing resource to:
change volumes of storage nodes of the consistency group of the second cluster from a read only state to a readable and writeable state; and
convert the consistency group of the second cluster from a slave role to a master role.

14. The distributed storage system of claim 9, wherein the instructions when executed by the processing resource cause the processing resource to release a consensus for the consistency group of the first cluster when setting the persistent fence.

15. The distributed storage system of claim 9, wherein the instructions when executed by the processing resource cause the processing resource to: obtain a new consensus for the consistency group of the second cluster; and persistently cache the new consensus with the consistency group of the second cluster, wherein the caching of the consensus provides non-disruptiveness in a double failure scenario where the second cluster performs a reboot and meanwhile the connectivity to a mediator fails in a transient or permanent manner.

16. A non-transitory computer-readable storage medium embodying a set of instructions, which when executed by a processing resource of a multi-site distributed storage system cause the processing resource to: initialize a starting state of a planned failover (PFO) of the multi-site distributed storage system to provide planned failover for control of serving input/output (I/O) operations from a host with a first cluster having a primary copy of data to a second cluster having a mirrored copy of the data; and perform a role change operation using an atomic test and set procedure to change a role for the second cluster for control of serving input/output (I/O) operations while avoiding a race between the first and second clusters in attempting to obtain consensus for control of serving input/output (I/O) operations from the host.

17. The non-transitory computer-readable storage medium of claim 16, wherein the atomic test and set procedure comprises checking whether a relationship state between the primary copy of the data and the mirrored copy of the data is synchronized.

18. The non-transitory computer-readable storage medium of claim 16, wherein the instructions when executed by the processing resource further cause the processing resource to set an owner of a consistency group of the data to be the second cluster when a relationship state is synchronized and this change in the owner of the consistency group is sufficient to fail any subsequent attempt from the first cluster to obtain consensus, wherein no change occurs for the owner of the consistency group when the relationship state is not synchronized.

19. The non-transitory computer-readable storage medium of claim 16, wherein the instructions when executed by the processing resource further cause the processing resource to persist a changed owner of a consistency group to the second cluster upon success of the atomic test and set procedure.

* * * * *